(12) United States Patent
Török et al.

(10) Patent No.: US 11,668,385 B2
(45) Date of Patent: Jun. 6, 2023

(54) METHOD FOR ACOUSTICALLY INFLUENCING TOOTHED WHEELS

(71) Applicants: AUDI AG, Ingolstadt (DE); Audi Hungaria Zrt, Györ (HU)

(72) Inventors: István Török, Györ (HU); Sebastian Pehnelt, Olpe (DE)

(73) Assignees: AUDI AG, Ingolstadt (DE); Audi Hungaria Zrt, Györ (HU)

( * ) Notice: Subject to any disclaimer, the term of this patent is extended or adjusted under 35 U.S.C. 154(b) by 310 days.

(21) Appl. No.: 16/769,359

(22) PCT Filed: Nov. 30, 2018

(86) PCT No.: PCT/EP2018/083121
§ 371 (c)(1),
(2) Date: Jun. 3, 2020

(87) PCT Pub. No.: WO2019/106140
PCT Pub. Date: Jun. 6, 2019

(65) Prior Publication Data
US 2020/0309241 A1     Oct. 1, 2020

(30) Foreign Application Priority Data
Dec. 3, 2017 (DE) .................. 10 2017 221 736.7

(51) Int. Cl.
*F16H 55/08*     (2006.01)
*B23F 19/12*     (2006.01)
(Continued)

(52) U.S. Cl.
CPC ............. *F16H 55/16* (2013.01); *B23F 19/12* (2013.01); *B23P 15/14* (2013.01);
(Continued)

(58) Field of Classification Search
CPC ................. F16H 55/16; F16H 55/0886; F16H 2055/086; B23F 19/12; B23P 15/14;
(Continued)

(56) References Cited

U.S. PATENT DOCUMENTS 5,610,994 A * 3/1997 Stadtfeld ............... G06T 7/0004
382/152
6,390,893 B1 * 5/2002 Stadtfeld ................. B23F 19/00
451/28
(Continued)

FOREIGN PATENT DOCUMENTS

| CN | 102052447 A | 5/2011 |
|---|---|---|
| CN | 103717943 A | 4/2014 |

(Continued)

OTHER PUBLICATIONS

German Examination Report dated Nov. 6, 2018 in corresponding German Application No. 10 2017 221 736.7; 6 pages including Machine-generated Translation attached.
(Continued)

*Primary Examiner* — Lawrence Averick
(74) *Attorney, Agent, or Firm* — Maier & Maier, PLLC

(57) ABSTRACT

An assembly for acoustically influencing toothed wheels, including at least one first toothed wheel having teeth and one second toothed wheel having teeth, wherein the teeth have flanks, wherein at least one flank of a tooth of the first toothed wheel can be engaged with a flank of a tooth of the second toothed wheel, wherein at least one flank of a tooth of the first toothed wheel forms a contact zone or, in the ideal case, a contact line with an engaging flank of a tooth of a second toothed wheel, wherein the contact zone or the contact line is formed at an angle $\alpha_{Aq}$, in particular between 5° and 85° or between 95° and 175°, in relation to an axis of an undulation, a microangle distribution, and/or a
(Continued)

microangle periodicity of the engaging flank of the tooth of the second toothed wheel.

7 Claims, 3 Drawing Sheets

(51) Int. Cl.
*G01B 11/26* (2006.01)
*G01B 11/30* (2006.01)
*G01M 13/021* (2019.01)
*F16H 55/16* (2006.01)
*B23P 15/14* (2006.01)

(52) U.S. Cl.
CPC ... *F16H 55/0886* (2013.01); *F16H 2055/086* (2013.01); *G01B 11/26* (2013.01); *G01B 11/30* (2013.01); *G01M 13/021* (2013.01); *Y10T 29/49464* (2015.01); *Y10T 29/49476* (2015.01)

(58) Field of Classification Search
CPC ..... G01B 11/26; G01B 11/30; G01B 11/2416; G01B 5/008; G01B 5/202; G01B 5/28; G01M 13/021; Y10T 29/49464; Y10T 29/49476
See application file for complete search history.

(56) References Cited

U.S. PATENT DOCUMENTS

| | | | | |
|---|---|---|---|---|
| 7,191,521 | B2* | 3/2007 | Litvin | F16H 55/0886 74/462 |
| 8,201,471 | B2* | 6/2012 | Ohmi | F16H 55/0886 74/462 |
| 2010/0011895 | A1* | 1/2010 | Ohmi | F16H 55/0886 74/462 |
| 2014/0256223 | A1* | 9/2014 | Geiser | B23F 17/001 451/5 |
| 2015/0338201 | A1* | 11/2015 | Wuerfel | B23F 23/006 33/504 |
| 2016/0178046 | A1* | 6/2016 | Goto | B61C 9/38 74/414 |

FOREIGN PATENT DOCUMENTS

| | | |
|---|---|---|
| CN | 103807409 A | 5/2014 |
| DE | 1 164 187 A | 2/1964 |
| DE | 2 011 245 A1 | 9/1971 |
| DE | 41 12122 A1 | 10/1991 |
| DE | 10 2013 003 795 A1 | 9/2014 |
| DE | 10 2014 109 914 A1 | 1/2016 |
| DE | 10 2016 223 058 A1 | 5/2018 |
| DE | 102017221736 B4 | 11/2021 |
| EP | 3717799 B1 | 10/2020 |

OTHER PUBLICATIONS

International Search Report and Written Opinion dated Feb. 13, 2019 in corresponding International Application No. PCT/EP2018/083121; 7 pages.

* cited by examiner

METHOD FOR ACOUSTICALLY INFLUENCING TOOTHED WHEELS

FIELD

The disclosure relates to an assembly and a method for acoustically influencing toothed wheels.

BACKGROUND

Toothed wheel connections, which are often designed as linear toothins have been used in drives of vehicles up to this point, in particular in the case of balance shafts. When two toothed wheels of a toothed wheel connection intermesh, a contact line or contact zone is formed, which extends in parallel to an axis of rotation of a toothed wheel. The teeth of the toothed wheels have flanks, wherein the flanks have undulations which are theoretically in parallel to the contact line or contact zone and to one another. The undulations on the engaging flanks can thus easily intermesh, whereby a noise level results, however. Moreover, methods for analyzing the undulations of teeth are known.

A device having a toothed wheel and a spur wheel stage and also a method for producing the toothed wheel are known from the document DE 10 2014 109 914 A1. A contact line or contact zone of a toothing is disclosed, which has two inclined sections on the outer ends thereof, which are tangentially connected to a middle, curved section.

The document DE 2 011 245 A1 discloses an involute helical toothing for spur gears having external toothing and internal toothing and a tool for finish machining. A spur gear toothing is disclosed in this case, which has a width crowning and generates a softer tooth engagement.

A method and a device for producing or testing helical-toothed involute spur gears are known from the document CH 525 737 A. It is disclosed in this case that a geometry of a toothed wheel is designed in such a way that a contact line or contact zone extends linearly and obliquely over a tooth flank.

Devices and methods for producing and testing toothed wheels are known in the prior art. However, it is conceivable in this case that an elevated level of noise is produced due to the engagement of the teeth in the toothed wheels, in particular in the case of a linear toothing. The automotive industry is making efforts to increasingly reduce the noise level of vehicles, however.

It is therefore an object of the present disclosure to provide a device and a method, using which the noise level of a transmission of a vehicle can be reduced.

The subject matter of the present invention is an assembly for acoustically influencing toothed wheels comprising at least one first toothed wheel having teeth and one second toothed wheel having teeth, wherein the teeth have flanks, wherein at least one flank of one tooth of the first toothed wheel can be engaged with one flank of one tooth of the second toothed wheel. In this case, at least two flanks of two teeth of the first toothed wheel can also be engaged with two flanks of one tooth of the second toothed wheel. Such assemblies are used, inter alia, in a balance shaft in a transmission in a vehicle. In an alternative embodiment, the assembly can comprise at least three toothed wheels having teeth. The flanks of the teeth of the toothed wheels can preferably be engaged with one another via a linear or helical spur toothing.

According to the invention, at least one flank of a tooth of the first toothed wheel forms a contact zone or contact line with an engaging flank of a tooth of the second toothed wheel, wherein the contact zone or contact line is formed at an angle $\alpha_{Aq}$, in particular between 5° and 85° or an angle between 95° and 175°, in relation to an axis of an undulation of a microangle distribution or a microangle periodicity of the engaging flank of the tooth of the second toothed wheel. A contact zone is preferably an oblong region here, which is formed upon intermeshing of two toothed wheels by a contact of a flank of a tooth of the first toothed wheel and a flank of a tooth of the second toothed wheel. In an ideal case, the contact zone is formed as a contact line. The contact line is optionally formed centrally in the contact zone. In an original state, the axis of an undulation of a flank of a tooth of the toothed wheel extends in parallel in each case to a contact line or contact zone of the respective flank of the respective tooth of the toothed wheel or the engaging toothed wheel. Due to the formation of the contact line or contact zone at a nonzero angle in relation to an axis of the undulation of the flank of the tooth of the second toothed wheel, the contact line or contact zone does not extend in parallel to the undulation of the flank of the tooth of the second toothed wheel. The undulations of the flank of the tooth of the first toothed wheel and the flank of the tooth of the second toothed wheel are thus prevented from being able to intermesh easily and thus form a high noise level. Advantageously, the angle between a contact line or contact zone of the tooth of the first toothed wheel and an axis of the undulation of the flank of the tooth of the second toothed wheel and/or an axis of the undulation of the flank of the tooth of the first toothed wheel is between 5° and 85° or between 95° and 175°.

In one refinement of the invention, the contact line or contact zone is formed based on a design of a face, in particular a surface, of the flank of the tooth of the first toothed wheel. The contact line or contact zone is influenced in particular based on the design of the surface of the flank of the tooth of the first toothed wheel. Based on a change of the surface of the flank of the tooth of the first toothed wheel, the course of the contact line or contact zone between the flank of the tooth of the first toothed wheel and the flank of the tooth of the second toothed wheel is thus also changeable. The surface of the flank of the tooth of the first toothed wheel and/or the surface of the flank of the tooth of the second toothed wheel can be set by a setting of process variables. This offers the advantage that due to the change of the surface of the flank of the tooth of the first and/or the second toothed wheel, the contact line or contact zone between the flank of the tooth of the first toothed wheel and the flank of the tooth of the second toothed wheel is changeable in such a way that it is not formed in parallel to an axis of the undulation of the flank of the tooth of the first toothed wheel or the undulation of the engaging tooth of the second toothed wheel. The surface of a flank is changeable by means of rolling methods, grinding methods (for example, honing), or by other manufacturing methods.

In one preferred refinement of the invention, the surface of the flank of the tooth of the first toothed wheel is formed based on a setting combination of process variables, in particular a setting of an interleaving and/or a setting of a crowning, in particular a height crowning and/or a width crowning. A setting of the flank of the tooth of the first toothed wheel based on these process variables offers the option of forming a contact line or contact zone between the flank of the tooth of the first toothed wheel and the flank of the tooth of the second toothed wheel as needed. Due to the setting of the surface of the flank of the tooth of the first toothed wheel based on the process variables, in particular a contact line or contact zone can be formed between the flank of the tooth of the first toothed wheel and the flank of the tooth of the second toothed wheel, which are formed at a nonzero angle in relation to the axis of the undulation of the flank of the tooth of the first toothed wheel and/or the flank of the tooth of the second toothed wheel, which engages in the flank of the first toothed wheel. This enables a softer intermeshing of the flank of the tooth of the first toothed wheel with the flank of the tooth of the second toothed wheel, whereby the noise level can be reduced during the operation of a transmission comprising the assembly. The face of the flank of the tooth of the first toothed wheel can be formed by machining, in particular by grinding or rolling. Grinding, for example, honing, enables a particularly precise formation of an interleaving and/or a crowning, in particular a height crowning and/or a width crowning, of the flank and thus of the surface of the tooth of the first toothed wheel. Alternatively, the face of the flank of the first toothed wheel can be formed by rolling. Preferably, the surface of at least one flank of a tooth of the first toothed wheel is formed based on a setting combination of process variables, in particular a setting of an interleaving and/or a setting of a crowning, in particular a height crowning and/or a width crowning. Particularly preferably, the surfaces of all flanks of all teeth of the first toothed wheel are formed based on a setting combination of process variables, in particular a setting of an interleaving and/or a setting of a crowning, in particular a height crowning and/or a width crowning.

In one design, the face of the flank of the tooth of the first toothed wheel is formed based on at least one set interleaving and a set slight crowning. The slight crowning can be formed in this case as a height crowning or width crowning or from a combination thereof. A slight crowning is formed here in a range of a few micrometers (μm) in dependence on a length of a tooth $L_\beta$ of a toothed wheel. The face of the flank can be formed concave or convex in this case. A design of the surface of the flank of the tooth of the first toothed wheel having an interleaving and an additional slight crowning offers the advantage that the surface is formed curved in such a way that the contact line or contact zone formed upon the intermeshing of the flank of the tooth of the first toothed wheel with the flank of the tooth of the second toothed wheel is formed at an angle between 5° and 85° or between 95° and 175° in relation to an undulation of the flank of the tooth of the second toothed wheel extending in parallel to an axis of rotation of the transmission, which engages in the flank of the tooth of the first toothed wheel. Alternatively, the face of the flank of the tooth of the first toothed wheel can be formed based on at least one set interleaving and a taller crowning. The formation of the face of the flank of the tooth of the first toothed wheel, and thus of the surface of the flank of the tooth of the first toothed wheel, is possible in this case by any combination of the process variables, an interleaving and/or a height crowning and/or a width crowning. The assembly optionally comprises at least three toothed wheels which intermesh. In this case, at least one tooth of each of the three toothed wheels has at least one flank having a ground surface as described above.

In one preferred refinement, the assembly comprises a measuring device, which is designed to detect the surface of at least one flank. The measuring device can be a device having a scattered light sensor, a coordinate measuring device, a roughness measuring device, or another device which is capable of detecting the surface of a flank of a tooth of a toothed wheel. Alternatively, the measuring device is designed as a robot. A surface of a flank of a tooth of the first and/or second toothed wheel is detectable by the measuring device, whereby a representation of the surface of a flank of a tooth of the first and/or second toothed wheel and thus of an undulation of the flank of a tooth of a first and/or second toothed wheel is enabled.

The subject matter of the invention is also a method for acoustically influencing toothed wheels. The method comprises an assembly having at least one first toothed wheel having teeth and one second toothed wheel having teeth, wherein the teeth have flanks, and wherein at least one flank of a tooth of the first toothed wheel can be engaged with a flank of a tooth of the second toothed wheel.

The method according to the invention comprises the provision of the assembly in a first step here. The assembly can comprise at least two toothed wheels having teeth. Alternatively, the assembly can comprise at least three toothed wheels having teeth. In a further step, an angle-resolving scattered light method is carried out to determine a macroundulation or macrotopography and a microundulation or microtopography of a surface of at least one flank of a tooth of the first toothed wheel. The macroundulation or macrotopography can alternatively be detected by means of a coordinate measuring device. The microundulation or microtopography can alternatively be detected by means of a tactile or optical roughness measuring device. The scattered light method offers the option of determining a macroundulation or macrotopography and a microundulation or microtopography by means of a single method. A macroundulation or macrotopography can thus be observed in combination with a microundulation or microtopography. In addition, up to one hundred percent online monitoring of the method for acoustically influencing is possible by means of the angle-resolving scattered light method. A microangle distribution of a surface of at least one flank of a tooth of a toothed wheel can be measured by means of the scattered light method. Optionally, a microangle distribution of a surface of a flank of a tooth of the first toothed wheel and a flank of a tooth of the second toothed wheel, which is engaged with the flank of the tooth of the first toothed wheel, is measured. The measurement can be carried out longitudinally or transversely in relation to a machining direction. The time for detecting the surface of respective flanks of respective teeth can be reduced by the scattered light method.

In a next step, a determination is performed of a variation of a micro angle distribution $A_q$ of the at least one flank of the tooth of the first toothed wheel as a measure of a microstructure and thus a determination of a condition of the surface of the flank of the tooth of the first toothed wheel. In this case, a determination of a variation of a micro distribution $A_q$ as a measure of a microstructure can also be carried out for a flank of a tooth of the second toothed wheel, which engages in the flank of the tooth of the first toothed wheel, to thus determine a condition of the surface of the flank of the tooth of the second toothed wheel.

In a further step, a representation of the condition of the surface of the at least one flank of the tooth of the first toothed wheel is performed in a false color image and a contact line or contact zone is overlaid between the at least one flank of the tooth of the first toothed wheel and at least one engaging flank of the tooth of the second toothed wheel. The contact zone is a region in which a flank of a tooth of a first toothed wheel, upon an engagement of a flank of a tooth of a second toothed wheel in the flank of the tooth of the first toothed wheel, meets the flank of the second toothed wheel and forms a contact. In an ideal case, the contact zone is approximately formed as a contact line. To avoid acoustically conspicuous behavior of the intermeshing flanks of the teeth of the first and the second toothed wheel, predetermined microangles ($A_q$ values) have to occur in the contact zone or contact line. The microangles $A_q$ are preferably at values between 2 and 90. A representation of the condition of the surface of the flank of the tooth of the second toothed wheel can optionally also be displayed in a false color image. Furthermore, a periodic occurrence of the microangles can be analyzed and can be quantified via the periodicity of the microangle distribution $\lambda_{Aq}$.

In a next step, a determination is performed of an acoustic angle $\alpha_{Aq}$ relevant to the microangle distribution between a preferred direction created by the machining and the contact line or contact zone between the at least one flank of the first toothed wheel and at least one engaging flank of the tooth of the second toothed wheel. The acoustic angle $\alpha_{Aq}$ has an influence on the acoustic behavior of the toothing in such a way that the acoustic angle $\alpha_{Aq}$ has to be in a predetermined range in order to avoid a high noise level. The acoustic angle is preferably between 5° and 85° or between 95° and 175° in this case.

In a further step, machining, for example, grinding, of the surface of the at least one flank of the tooth of the first toothed wheel is performed based on process variables, in particular a setting of an interleaving and/or a setting of a crowning, in particular a height crowning and/or a width crowning, and thus final machining of the contact line or contact zone between the flank of the tooth of the first toothed wheel and the flank of the tooth of the second toothed wheel, wherein the surface is ground in such a way that the contact line or contact zone is formed at an angle, in particular an angle between 5° and 85° or between 95° and 175°, in relation to an axis of an undulation of the flank of the tooth of the second toothed wheel and/or a flank of the tooth of the first toothed wheel, which engages in the flank of the tooth of the second toothed wheel. The contact line or contact zone is formed by the final machining (for example, grinding, rolling, smoothing), which is configured in such a way that it forms a microangle distribution and thus an acoustic angle, which is in the predetermined range, preferably between 2 and 90, for a low noise level. For example, the contact line or contact zone between the flank of the tooth of the first toothed wheel and the flank of the tooth of the second toothed wheel is ground at an acute or obtuse angle in relation to an axis of an undulation of the flank of the tooth of the first toothed wheel or the flank of the tooth of the second toothed wheel. By way of the grinding having set process variables, in particular having an interleaving and a slight width crowning, the surface of the at least one flank of a tooth of the first toothed wheel can be final machined in such a way that the contact line or contact zone between the flank of the tooth of the first toothed wheel and the flank of the tooth of the second toothed wheel has an angle between 5° and 85° or between 95° and 175° in relation to the undulation of the flank of the tooth of the first or the second toothed wheel extending in parallel to the axis of rotation. The acoustics of the at least two intermeshing toothed wheels can be influenced by the scattered light method by way of the grinding in this manner. The surface of at least one flank of a tooth can optionally be ground based on a combination of process variables, in particular an interleaving and/or a height crowning and/or a width crowning. The surface can also be rolled. The surface of the at least one flank of the tooth of the first toothed wheel is machined by the grinding, whereby a contact line or contact zone between the flank of the tooth of the first toothed wheel and the flank of the tooth of the second toothed wheel is influenced. Due to the formation or machining of the flank of the tooth of the first toothed wheel in such a manner that it forms an acute or obtuse angle in relation to an axis of an undulation of the flank of the tooth of the second toothed wheel, the contact line or contact zone between the flank of the tooth of the first toothed wheel and the flank of the tooth of the second toothed wheel does not extend in parallel to an undulation of the flank of the tooth of the first and/or second toothed wheel. The flank of the tooth of the first toothed wheel and the flank of the tooth of the second toothed wheel and the undulations of the flanks thereof are thus prevented from being able to intermesh easily and thus form a high noise level. Particularly preferably, all flanks of all teeth of a first toothed wheel are ground in such a way that the flanks of the teeth of the first toothed wheel are not formed in parallel to contact lines or contact zones and/or to undulations of flanks of teeth of a second toothed wheel.

In a further step, the provision of the assembly having the at least one ground flank of the tooth of the first toothed wheel in a transmission, startup of the transmission, and engagement of the ground flank of the tooth of the first toothed wheel in one or in the flank of one or the tooth of the second toothed wheel take place. By providing the assembly having the above-described features in a transmission of a vehicle, the noise level of the drive can be reduced. The method according to the invention moreover enables a time savings during a planar scanning of the at least one toothed wheel, whereby a one hundred percent measurement instead of a spot check measurement can possibly be performed when monitoring series production. This can in turn result in a higher level of process knowledge. The method according to the invention unifies the option of a surface inspection (microundulation or microtopography) and a shape inspection (macroundulation or macrotopography). One of the two or even both previously known inspection methods may thus be replaced, whereby costs can be saved.

In one refinement of the method, the angle-resolving scattered light method is carried out to determine a macroundulation or macrotopography and a microundulation or microtopography of a surface for at least one flank of a tooth of the first toothed wheel and at least one flank of a tooth of the second toothed wheel engaging in the flank of the tooth of the first toothed wheel. This offers the advantage that both at least one flank of a tooth of a first toothed wheel and also at least one flank of a tooth of the second toothed wheel, which engages with the flank of the tooth of the first toothed wheel, are detectable simultaneously.

In a further refinement of the method, an indication is given if the acoustic angle $\alpha_{Aq}$ is outside a tolerable value range. A value of the acoustic angle $\alpha_{Aq}$ is tolerable if it lies within the predetermined range, preferably between 5° and 85° or between 95° and 175°. The indication can be performed as a visual or acoustic signal. This offers the advantage that during the method for setting the acoustic influencing, deviations of the acoustic angle $\alpha_{Aq}$ outside a tolerable value range can be directly indicated to a technician.

In one preferred refinement of the method, the surface of the at least one flank of the tooth of the first toothed wheel is machined, preferably ground, in such a way that it has a set interleaving and a set slight crowning. Such grinding is particularly advantageous for influencing acoustics of intermeshing teeth. By way of the design of the surface of at least one flank of a tooth of a first toothed wheel using the process variables set in this manner, the surface of the at least one flank of the tooth of the first toothed wheel can be curved in such a way that the contact line or contact zone between the flank of the tooth of the first toothed wheel and the flank of the tooth of the second toothed wheel forms an angle between 5° and 85° or between 95° and 175° in relation to an undulation of the flank of the tooth of the first and/or the second toothed wheel extending in parallel to an axis of rotation of the transmission. An undulation of the flank of the tooth of the first toothed wheel is thus prevented from being able to engage easily in a flank of the tooth of the second toothed wheel and thus forming a high noise level. Optionally, by way of the granting of the surface of the flank of the tooth of the first toothed wheel, at least one process variable, in particular a preferred direction generated by the machining and/or an acoustic angle $\alpha_{Aq}$ and/or a periodicity of the microangle $\lambda_{Aq}$ and/or a microangle distribution and/or a peak-to-peak value is set. This offers the advantage that the process variables can be intentionally set by the method. A process variable can thus be changed as needed to influence a noise level.

The subject matter of the invention is moreover a vehicle comprising an above-described assembly.

BRIEF DESCRIPTION OF THE DRAWINGS

The disclosure is schematically illustrated in the drawings with the aid of embodiments and is described further with reference to the drawings. In the figures.

DETAILED DESCRIPTION

Figure 1:
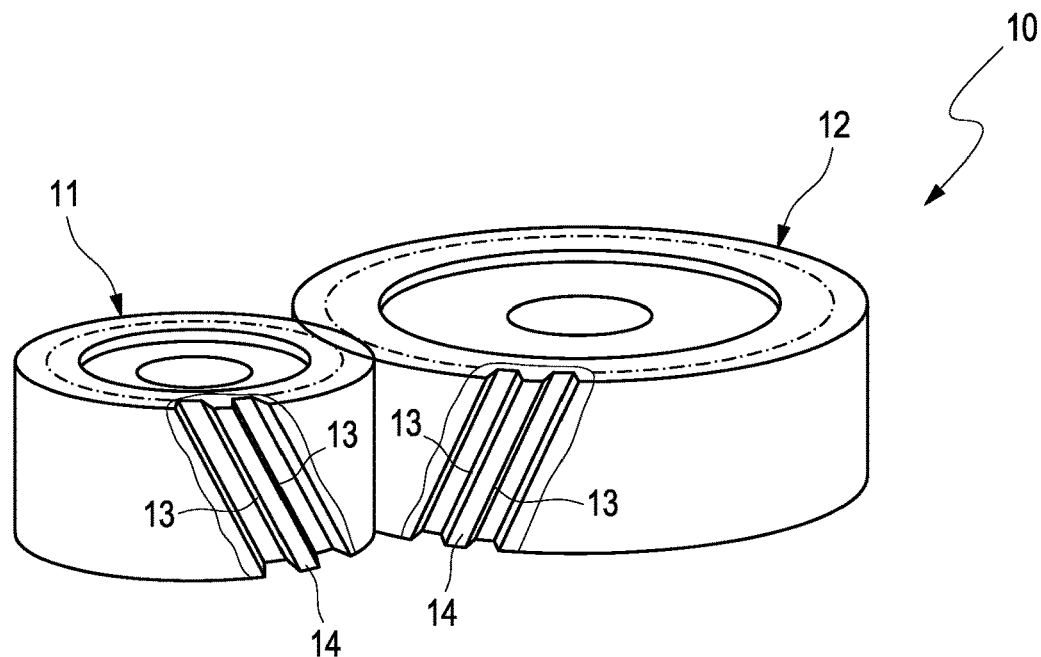
FIG. 1 shows a schematic illustration of an arrangement of an embodiment of an assembly according to the invention comprising a first toothed wheel and a second toothed wheel

FIG. 1 shows a schematic illustration of an arrangement of an embodiment of an assembly 10 according to the invention comprising a first toothed wheel 11 and a second toothed wheel 12 based on the example of a helical toothing. In this case, both the first toothed wheel 11 and also the second toothed wheel 12 have teeth 14. The teeth 14 each have flanks 13 here. At least one flank 13 of a tooth 14 of the first toothed wheel 11 can be engaged here with a flank 13 of a tooth 14 of the second toothed wheel 12. According to the invention, when the flank 13 of the tooth 14 of the first gear will 11 intermeshes with the flank 13 of the tooth 14 of the second toothed wheel 12, a contact line or contact zone (not shown in FIG. 1) is formed, which is formed at an angle, for example, an acute or obtuse angle, in relation to an axis of an undulation of the flank 13 of the tooth 14 of the first toothed wheel 11 and/or the second toothed wheel 12. In this case, the contact line or contact zone is formed based on a design of a face, in particular a surface, of the flank 13 of the tooth 14. The surface of the flank 13 is formed based on a setting combination of process variables, in particular a setting (shown in FIG. 4) of an interleaving 15 and/or a setting of a crowning 16, in particular a height crowning and/or a width crowning. The formation of the surface of the flank 13 based on at least one set interleaving 15 and one set slight crowning 16 (shown in FIG. 4) is particularly advantageous.

Figure 2:
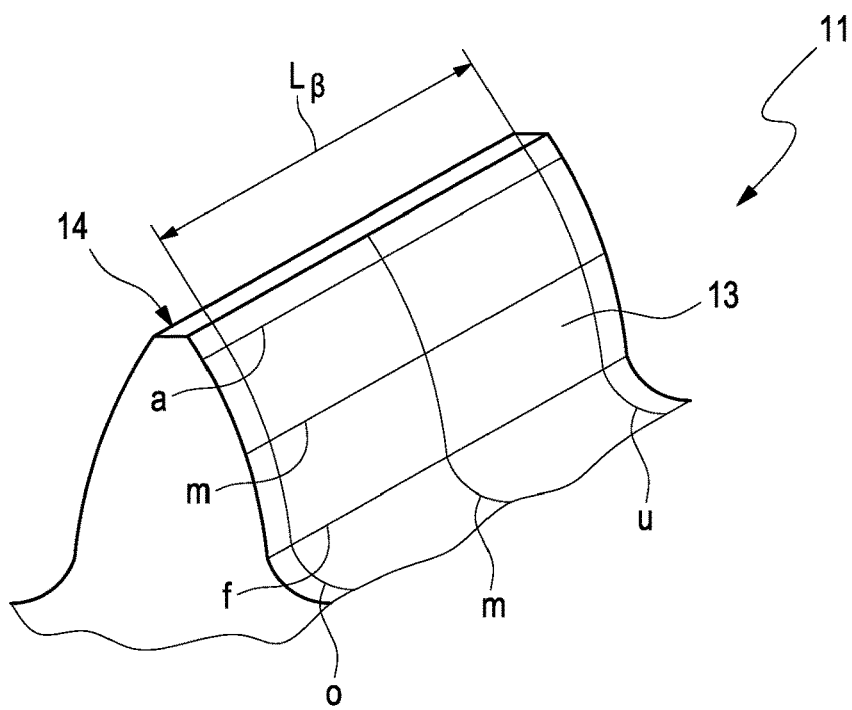
FIG. 2 shows a schematic illustration of a tooth of a toothed wheel having an illustration of flank lines (a, m, f) and profile lines (o, m, u) of a face of a flank, which can be set according to the invention.

FIG. 2 shows a schematic illustration of a tooth 14 of a first toothed wheel 11 having an illustration of flank lines (a, m, f) and profile lines (o, m, u) of a face of a flank 13. Along the alignment of the flank lines (a, m, f) and the profile lines (o, m, u), the design according to the invention of the face of the flank 13 is preferably performed, in particular a grinding of the face based on a setting of process variables, in particular a setting of an interleaving 15 (shown in FIG. 4) and/or a setting of a crowning 16, in particular a height crowning and/or a width crowning. Upon intermeshing of the flank 13 of the tooth 14 of the first toothed wheel 11 (shown in FIG. 1) with the flank 13 of the tooth 14 of the second toothed wheel 12 (shown in FIG. 1), a contact line or contact zone (not shown in FIG. 2) is thus formed. The crowning is dependent here on the length $L_\beta$ of the tooth of the toothed wheel. A slight crowning is preferably in a range of a few μm. A measure of $L_\beta/100$ is a rough guide in this case.

Figure 3:
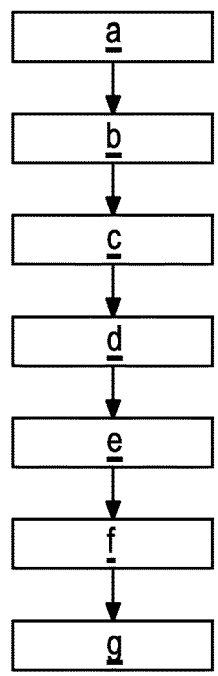
FIG. 3 shows a schematic profile of an embodiment of the method according to the invention for acoustically influencing toothed wheels.

FIG. 3 shows a schematic profile of one embodiment of the method according to the invention for acoustically influencing toothed wheels, comprising an assembly having a first toothed wheel having teeth and a second toothed wheel having teeth, wherein the teeth have flanks, and wherein at least one flank of a tooth of the first toothed wheel can be engaged with a flank of a tooth of the second toothed wheel. The method according to the invention comprises the provision of the assembly in a first step a) here. The assembly can be provided in a transmission of a vehicle. The assembly preferably comprises at least two toothed wheels having teeth. Alternatively, the assembly can also comprise at least three toothed wheels having teeth. In a further step b), an angle-resolving scattered light method is carried out to determine a macroundulation or macrotopography and a microundulation or microtopography of a surface of at least one flank of a tooth of the first toothed wheel. The macroundulation or macrotopography can alternatively be detected by means of a coordinate measuring device. The microundulation or microtopography can alternatively be detected by means of a tactile or optical roughness measuring device or surface measuring device. A microangle distribution of the surface of the flank of the tooth of the first toothed wheel is measured by means of the scattered light method. Alternatively, a microangle distribution of the surface of the flank of the tooth of the second toothed wheel can be measured by means of the scattered light method. In particular the time for detecting the surface of flanks of teeth can be reduced by the scattered light method. In a step c), a determination is performed of a variation of a micro angle distribution $A_q$ of the at least one flank of the tooth of the first toothed wheel as a measure of a microstructure and thus a determination of a condition of the surface of the at least one flank of the tooth of the first toothed wheel. Optionally, it is also possible to determine a variation of a microangle distribution $A_q$ as a measure for a microstructure and thus a condition of the surface of a flank of a tooth of the second toothed wheel. In a step d), a representation of the condition of the surface of the at least one flank of the tooth of the first toothed wheel is performed in a false color image and a contact line or contact zone is overlaid between the at least one flank of the tooth of the first toothed wheel and at least one engaging flank of the tooth of the second toothed wheel.

The contact zone or contact line is a zone in which the flank of the tooth of the first toothed wheel meets the flank of the tooth of the second toothed wheel. To avoid acoustically conspicuous behavior of the intermeshing flanks of the teeth of the first and the second toothed wheel, microangles ($A_q$ values) of a predetermined value have to occur in the contact zone or contact line between the flank of the tooth of the first toothed wheel and the flank of the tooth of the second toothed wheel. Moreover, a periodic occurrence of the microangles can be analyzed and quantified via the periodicity of the microangle distribution $\lambda_{Aq}$. In a step e), a determination is performed of an acoustic angle $\alpha_{Aq}$ relevant to the microangle distribution between a preferred direction created by the machining and the contact zone or contact line between the at least one flank of the first toothed wheel and at least one engaging flank of the tooth of the second toothed wheel. The acoustic angle $\alpha_{Aq}$ has an influence on the acoustic behavior of the toothing in such a way that the acoustic angle $\alpha_{Aq}$ has to be in a predetermined range in order to avoid a high noise level. In a step f), machining or grinding of the surface of the flank of the tooth of the first toothed wheel is performed based on process variables, in particular a setting of an interleaving and/or a setting of a crowning, in particular a height crowning and/or a width crowning, and thus final machining of the contact line or contact zone between the at least one flank of the tooth of the first toothed wheel and the flank of the tooth of the second toothed wheel, wherein the surface is ground in such a way that the contact line or contact zone is formed at an angle, in particular an angle between 5° and 85° or between 95° and 175°, in relation to an axis of an undulation of the flank of the tooth of the first toothed wheel and/or a flank of the tooth of the second toothed wheel, which engages in the flank of the tooth of the first toothed wheel. The axes of the undulations of the flanks of the teeth of the first and the second toothed wheel each extend, in an original unground state, in parallel to the contact line or contact zone between the flank of the tooth of the first toothed wheel and the flank of the tooth of the second toothed wheel According to the invention, the surface of at least one flank of a tooth of the first toothed wheel is ground based on a combination of process variables, in particular an interleaving and/or a height crowning and/or a width crowning. In particular, the surface of the flank is ground based on an interleaving and a slight width crowning. The surface of the face of the flank of the tooth of the first toothed wheel is machined by the machining or the grinding, whereby the contact line or contact zone is influenced. By way of the grinding having set process variables, in particular having an interleaving and a slight width crowning, the surface of the flank of the tooth of the first toothed wheel can preferably be ground in such a way that the contact line or contact zone has an angle between 5° and 85° or between 95° and 175° in relation to the undulation of the flank of the tooth of the first toothed wheel and/or the second toothed wheel extending in parallel to the axis of rotation. In particular, at least the face of the flank of the tooth of the first toothed wheel is machined or ground in such a way that it has a set interleaving and a set slight crowning. The formation of a slight crowning of the flank of the first tooth of the first toothed wheel together with the interleaving is particularly suitable to form a contact line or contact zone which has an angle between 5° and 85° or between 95° and 175° in relation to the undulation of the flank of the tooth of the second toothed wheel extending in parallel to the axis of rotation. Other combinations of the mentioned process variables are also possible. In a further step g), the provision of the assembly having the at least one ground flank of the tooth of the first toothed wheel in a transmission, startup of the transmission, and engagement of the ground flank of the tooth of the first toothed wheel with one flank of a tooth of the second toothed wheel take place. By providing the assembly having the above-described features in a transmission of a vehicle, the noise level of the drive can be reduced.

Figure 4:
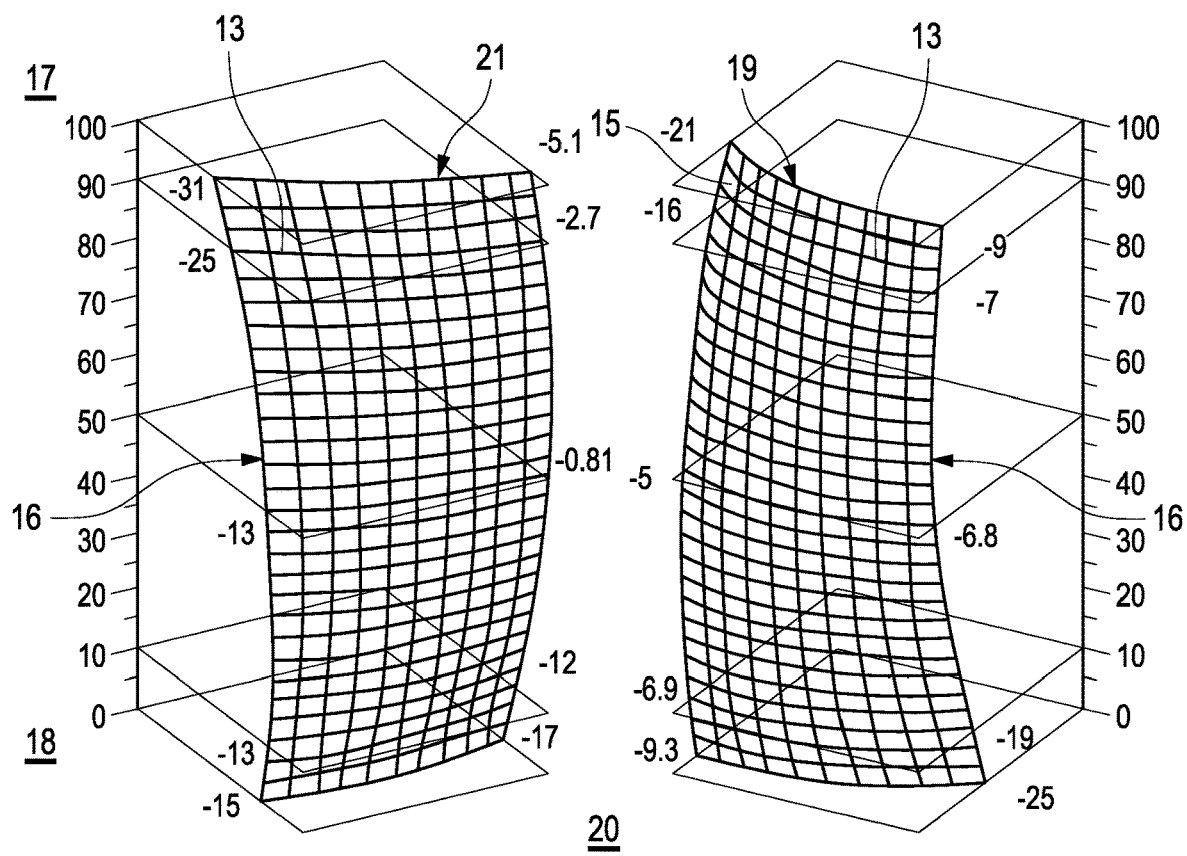
FIG. 4 shows a schematic illustration of a measuring method of flanks of teeth ground according to the invention.

FIG. 4 shows a schematic illustration of topologically ground faces of flanks 13 of teeth (not shown). A left flank 21 and a right flank 19 of teeth are shown, which are illustrated in the extension thereof upward 17 and downward 18 in relation to a base 20. The left flank 21 displays a surface here which has a crowning 16, while the right flank 19 has a surface which is formed by an interleaving 15 and a crowning 16. The interleaving 15 preferably extends here from top 17 to bottom 18. The crowning 16 can be formed as a height crowning and/or a width crowning. The surfaces of the flanks 13 are formed by the machining or the grinding based on the process variables interleaving 15 and crowning 16 in such a way that upon meshing of the flanks 13 of two toothed wheels, a contact line or contact zone (not shown) forms between meshing flanks 13 (not shown) of the teeth (not shown), wherein deformed contact line or contact zone preferably forms an angle between 5° and 85° or between 95° and 175° in relation to an undulation of the flanks 13 of the teeth of the toothed wheels extending in parallel to an axis of rotation of the transmission. A noise level which occurs during the operation of a transmission can be reduced by the use of toothed wheels having teeth ground in this manner.

Figure 5:
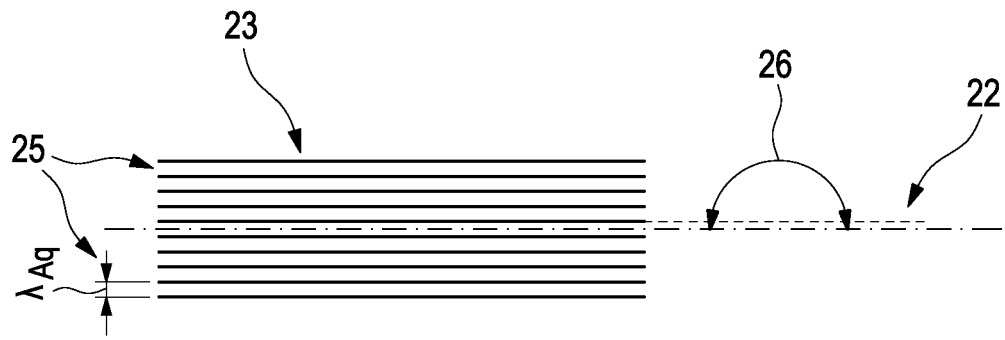
FIG. 5a shows a schematic illustration of the determination of an acoustic angle $\alpha_{Aq}$ relevant to the microangle distribution between a preferred direction created by the machining and a contact zone or line.
FIG. 5b shows a schematic illustration of the determination of an acoustic angle $\alpha_{Aq}$ relevant to the microangle distribution between a preferred direction created by the machining and a contact zone or contact line.
Figure 5:
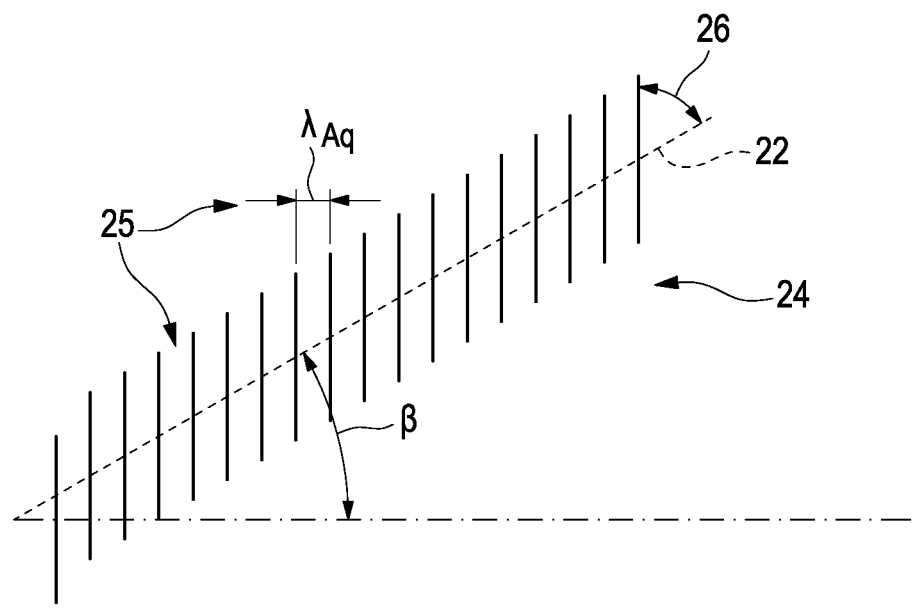

FIG. 5a shows a schematic illustration of the determination of an acoustic angle $\alpha_{Aq}$ 26 relevant to the microangle distribution between a preferred direction created by the machining and a contact zone or contact line 22. A case of a linear toothing 23 having an angle β of 0° of toothed wheels (not shown), representing an acoustic angle $\alpha_{Aq}$ 26 of 180°, is shown here. The acoustic angle $\alpha_{Aq}$ 26 has an influence on the acoustic behavior of the toothing of the toothed wheels in such a manner that the acoustic angle $\alpha_{Aq}$ 26 has to be in a predetermined range to avoid a high noise level. In order to ensure quiet operation of the toothing, the acoustic angle $\alpha_{Aq}$ 26 should preferably be between 5° to 85° or between 95° and 175°. With an acoustic angle $\alpha_{Aq}$ 26 of 90° or 180°, the operation of the meshing teeth of the toothing is perceived to be excessively loud Furthermore, a periodic occurrence of the microangles can be analyzed and quantified via the periodicity of the microangle distribution $\lambda_{Aq}$ 25.

FIG. 5b shows a schematic illustration of the determination of an acoustic angle $\alpha_{Aq}$ 26 relevant to the microangle distribution between a preferred direction created by the machining and a contact zone or contact line 22. A case of a helical toothing 24, in which the angle β is not equal to 0°, is shown here. The contact zone or contact line 22 thus does not extend in parallel to an axis of rotation of a toothed wheel. The acoustic angle $\alpha_{Aq}$ 26 is formed between the contact zone or contact line 22 and the periodically occurring microangle distribution $\lambda_{Aq}$ 25.

The invention claimed is:

1. A method for acoustically influencing toothed wheels, comprising:
   an assembly having at least one first toothed wheel having teeth and one second toothed wheel having teeth, wherein the teeth have flanks, and wherein at least one flank of a tooth of the first toothed wheel can be engaged with a flank of a tooth of the second toothed wheel, comprising the following steps:

a) providing the assembly,
b) carrying out an angle-resolving scattered light method to determine a macroundulation or macrotopography and a microundulation or microtopography of a surface of the at least one flank of the tooth of the first toothed wheel,
c) determining a variation of a microangle distribution $A_q$ of the at least one flank of the tooth of the first toothed wheel as a measure of a microstructure and thus determining a condition of the surface of the at least one flank of the tooth of the first toothed wheel,
d) representing the condition of the surface of the at least one flank of the tooth of the first toothed wheel in a false color image and overlaying a contact zone or contact line between the at least one flank of the tooth of the first toothed wheel and the at least one engaging flank of the tooth of the second toothed wheel,
e) determining an acoustic angle $\alpha_{Aq}$ relevant to the microangle distribution between a preferred direction created by the machining and the contact zone or contact line between the at least one flank of the tooth of the first toothed wheel and the at least one engaging flank of the tooth of the second toothed wheel,
f) machining or grinding the surface of the at least one flank of the tooth of the first toothed wheel based on process variables, in particular a setting of an interleaving and/or a setting of a crowning, in particular a height crowning and/or a width crowning, and thus final machining of the contact line or contact zone between the flank of the tooth of the first toothed wheel and the flank of the tooth of the second toothed wheel, wherein the surface is ground in such a way that the contact line or contact zone is formed at an angle, in particular an angle between 5° and 85° or between 95° and 175°, in relation to an axis of an undulation of the engaging flank of the tooth of the second toothed wheel and/or the flank of the tooth of the first toothed wheel in which the flank of the tooth of the second toothed wheel engages,
g) providing the assembly having the at least one ground flank of the tooth of the first gear in a transmission, starting up the transmission.

2. The method as claimed in claim 1, wherein the angle-resolving scattered light method is carried out to determine a macroundulation or macrotopography and a microundulation or microtopography of a surface for the at least one flank of the tooth of the first toothed wheel and the at least one flank of the tooth of the second toothed wheel engaging in the flank of the tooth of the first toothed wheel.

3. The method as claimed in claim 2, wherein an indication is given if the acoustic angle $\alpha_{Aq}$ is outside a tolerable value range.

4. The method as claimed in claim 2, wherein the surface of the at least one flank of the tooth of the first toothed wheel is machined in such a way that it has a set interleaving and a set slight crowning.

5. The method as claimed in claim 1, wherein an indication is given if the acoustic angle $\alpha_{Aq}$ is outside a tolerable value range.

6. The method as claimed in claim 5, wherein the surface of the at least one flank of the tooth of the first toothed wheel is machined in such a way that it has a set interleaving and a set slight crowning.

7. The method as claimed in claim 1, wherein the surface of the at least one flank of the tooth of the first toothed wheel is machined in such a way that it has a set interleaving and a set slight crowning.

* * * * *